(12) United States Patent
Chen et al.

(10) Patent No.: US 9,591,646 B2
(45) Date of Patent: Mar. 7, 2017

(54) REFERENCE SIGNAL POWER IMPACT DETERMINATION IN NEW CARRIER TYPE IN LTE

(71) Applicant: QUALCOMM Incorporated, San Diego, CA (US)

(72) Inventors: Wanshi Chen, San Diego, CA (US); Tao Luo, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 13/914,531

(22) Filed: Jun. 10, 2013

(65) Prior Publication Data
US 2013/0329662 A1     Dec. 12, 2013

Related U.S. Application Data

(60) Provisional application No. 61/658,812, filed on Jun. 12, 2012.

(51) Int. Cl.
  *H04W 72/04* (2009.01)
  *H04W 52/32* (2009.01)
  (Continued)

(52) U.S. Cl.
  CPC ....... *H04W 72/0473* (2013.01); *H04L 1/0026* (2013.01); *H04L 1/1841* (2013.01);
  (Continued)

(58) Field of Classification Search
  CPC ... H04L 5/0023; H04L 5/0044; H04L 5/0053; H04L 5/0048; H04L 5/001;
  (Continued)

(56) References Cited

U.S. PATENT DOCUMENTS

2010/0254471 A1   10/2010   Ko et al.
2011/0085457 A1   4/2011    Chen et al.
(Continued)

FOREIGN PATENT DOCUMENTS

WO    2011054159 A1    5/2011
WO    2013151395 A1    10/2013

OTHER PUBLICATIONS

3rd Generation Partnership Project; Technical Specification Group Radio Access Network ; Evolved Universal Terrestrial Radio Access (E-UTRA) ; Physical layer procedures (Release 10), 3GPP Standard; 3GPP TS 36.213, 3rd Generation Partnership Project (3GPP), Mobile Competence Centre ; 650, Route Des Lucioles ; F-06921 Sophia-Antipolis Cedex; France, vol. RAN WG1, No. V10.5.8, Mar. 7, 2012 (Mar. 7, 2012), pp. 1-125 , XP050579996 , [retrieved on Mar. 7, 2012] paragraph [05.2].

(Continued)

*Primary Examiner* — Michael Thier
*Assistant Examiner* — Rownak Islam
(74) *Attorney, Agent, or Firm* — Arent Fox LLP

(57) ABSTRACT

A method, an apparatus, and a computer program product for wireless communication are provided. The apparatus may be a UE. The apparatus determines a first bandwidth and a second bandwidth of a cell, wherein a reference signal is present in the second bandwidth and is not present outside the second bandwidth. The apparatus receives a physical channel with at least one resource block in a subframe from the cell, the subframe including one or more symbols. The apparatus determines at least one energy per resource element (EPRE) ratio for the received physical channel based at least in part on the first bandwidth and the second bandwidth. The apparatus processes the physical channel based on the determined EPRE ratio.

68 Claims, 16 Drawing Sheets

(51) Int. Cl.
*H04L 5/00* (2006.01)
*H04L 1/00* (2006.01)
*H04L 1/18* (2006.01)
*H04W 52/14* (2009.01)
*H04W 28/06* (2009.01)
*H04W 72/00* (2009.01)
*H04W 48/12* (2009.01)
*H04L 27/26* (2006.01)

(52) U.S. Cl.
CPC ............ *H04L 5/001* (2013.01); *H04L 5/0023* (2013.01); *H04L 5/0044* (2013.01); *H04L 5/0048* (2013.01); *H04L 5/0053* (2013.01); *H04W 52/325* (2013.01); *H04L 5/005* (2013.01); *H04L 27/2611* (2013.01); *H04W 28/06* (2013.01); *H04W 48/12* (2013.01); *H04W 52/143* (2013.01); *H04W 72/00* (2013.01); *H04W 72/044* (2013.01)

(58) Field of Classification Search
CPC ..... H04L 5/005; H04L 1/0026; H04L 1/1841; H04L 27/2611; H04W 52/143; H04W 52/325; H04W 28/06; H04W 72/00; H04W 72/0473; H04W 48/12; H04W 72/04; H04W 72/044
USPC .................................................. 370/329, 328
See application file for complete search history.

(56) References Cited

U.S. PATENT DOCUMENTS

| | | | |
|---|---|---|---|
| 2011/0170496 | A1 | 7/2011 | Fong et al. |
| 2012/0238310 | A1* | 9/2012 | Xiao ..................... H04W 52/24 455/522 |
| 2012/0307761 | A1 | 12/2012 | Zhang et al. |
| 2012/0327894 | A1 | 12/2012 | Axmon et al. |
| 2013/0003604 | A1* | 1/2013 | Blankenship ......... H04L 5/0053 370/255 |
| 2013/0250879 | A1* | 9/2013 | Ng et al. ....................... 370/329 |
| 2014/0086166 | A1* | 3/2014 | Lindbom et al. ............. 370/329 |
| 2014/0254504 | A1* | 9/2014 | Bashar .................. H04L 5/0048 370/329 |
| 2015/0092691 | A1* | 4/2015 | Hwang ................. H04L 5/0048 370/329 |

OTHER PUBLICATIONS

International Search Report and Written Opinion—PCT/US2013/045251, International Search Authority—European Patent Office, Dec. 11, 2013.
Nokia Siemens Networks., et al., "Considerations on Unsynchronised New Carrier Types", 3GPP Draft; R1-121267, 3rd Generationpartnership Project (3GPP), Mobile Competence Center; 650, Route Des Lucioles; F-06921 Sophia-Antipolis Cedex; France, vol. RAN WG1, No. Jeju, Korea; Mar. 26, 2012-Mar. 30, 2012, Mar. 20, 2012 (Mar. 20, 2012), XP050599556, [retrieved on Mar. 20, 2012].

* cited by examiner

REFERENCE SIGNAL POWER IMPACT DETERMINATION IN NEW CARRIER TYPE IN LTE

CROSS-REFERENCE TO RELATED APPLICATIONS

This application claims the benefit of U.S. Provisional Application Ser. No. 61/658,812, entitled "Reference Signal Power Impact Determination in New Carrier Type in LTE" and filed on Jun. 12, 2012, which is expressly incorporated by reference herein in its entirety.

BACKGROUND

Field

The present disclosure relates generally to communication systems, and more particularly, to reference signal power impact determination in new carrier type in LTE.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines a first bandwidth and a second bandwidth of a cell, wherein a reference signal is present in the second bandwidth and is not present outside the second bandwidth. The apparatus receives a physical channel with at least one resource block in a subframe from the cell, the subframe including one or more symbols. The apparatus determines at least one energy per resource element (EPRE) ratio for the received physical channel based at least in part on the first bandwidth and the second bandwidth. The apparatus processes the physical channel based on the determined at least one EPRE ratio.

DETAILED DESCRIPTION

Figure 1:
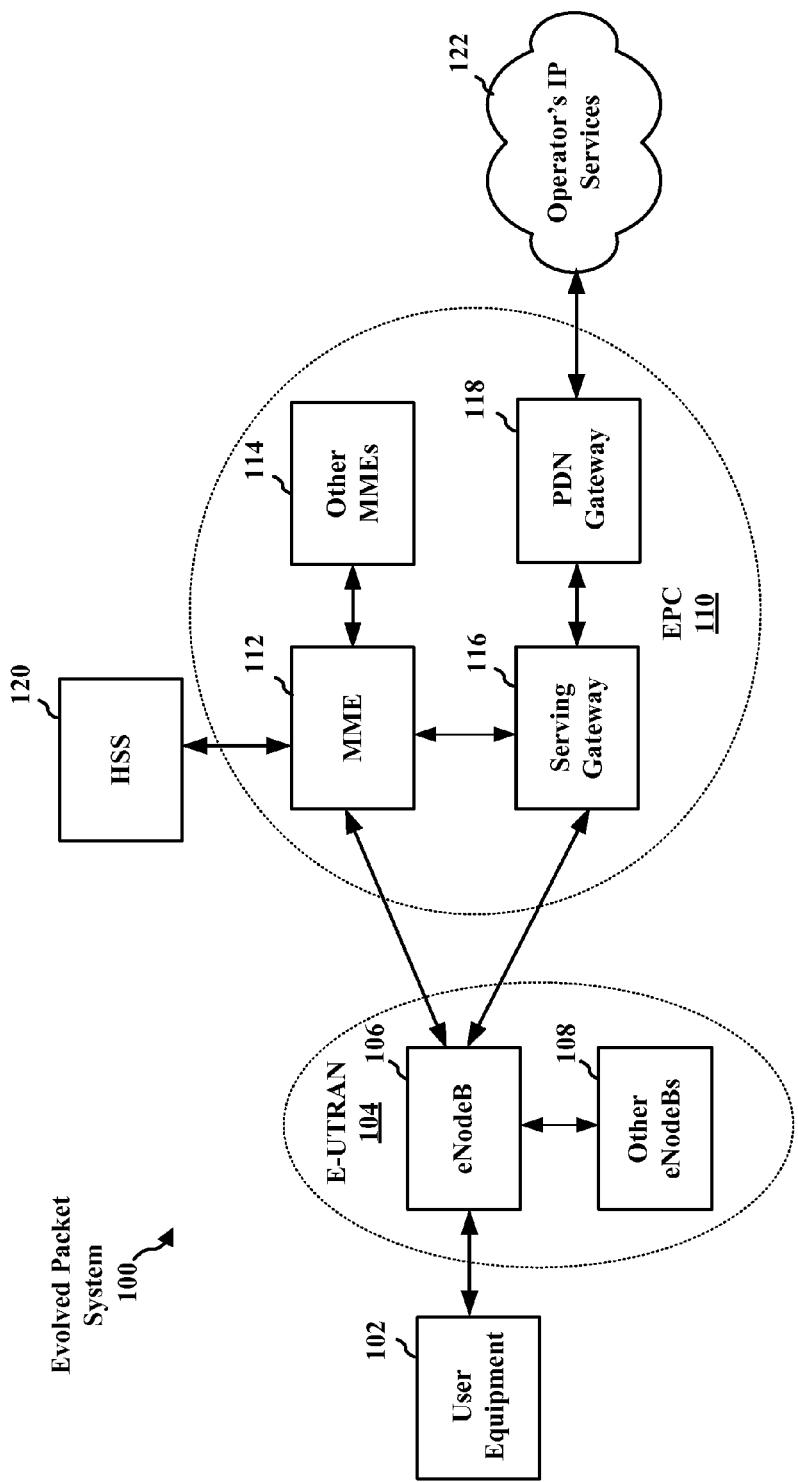
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
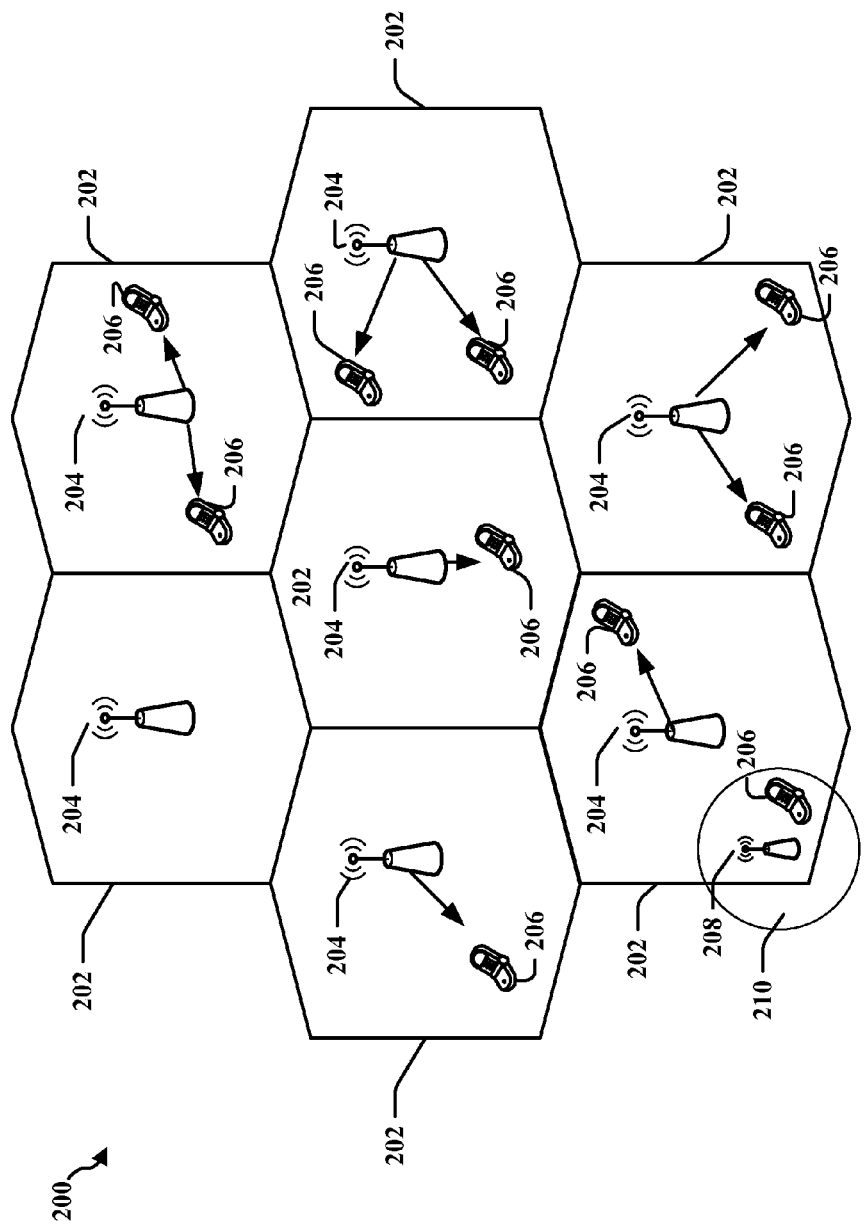
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
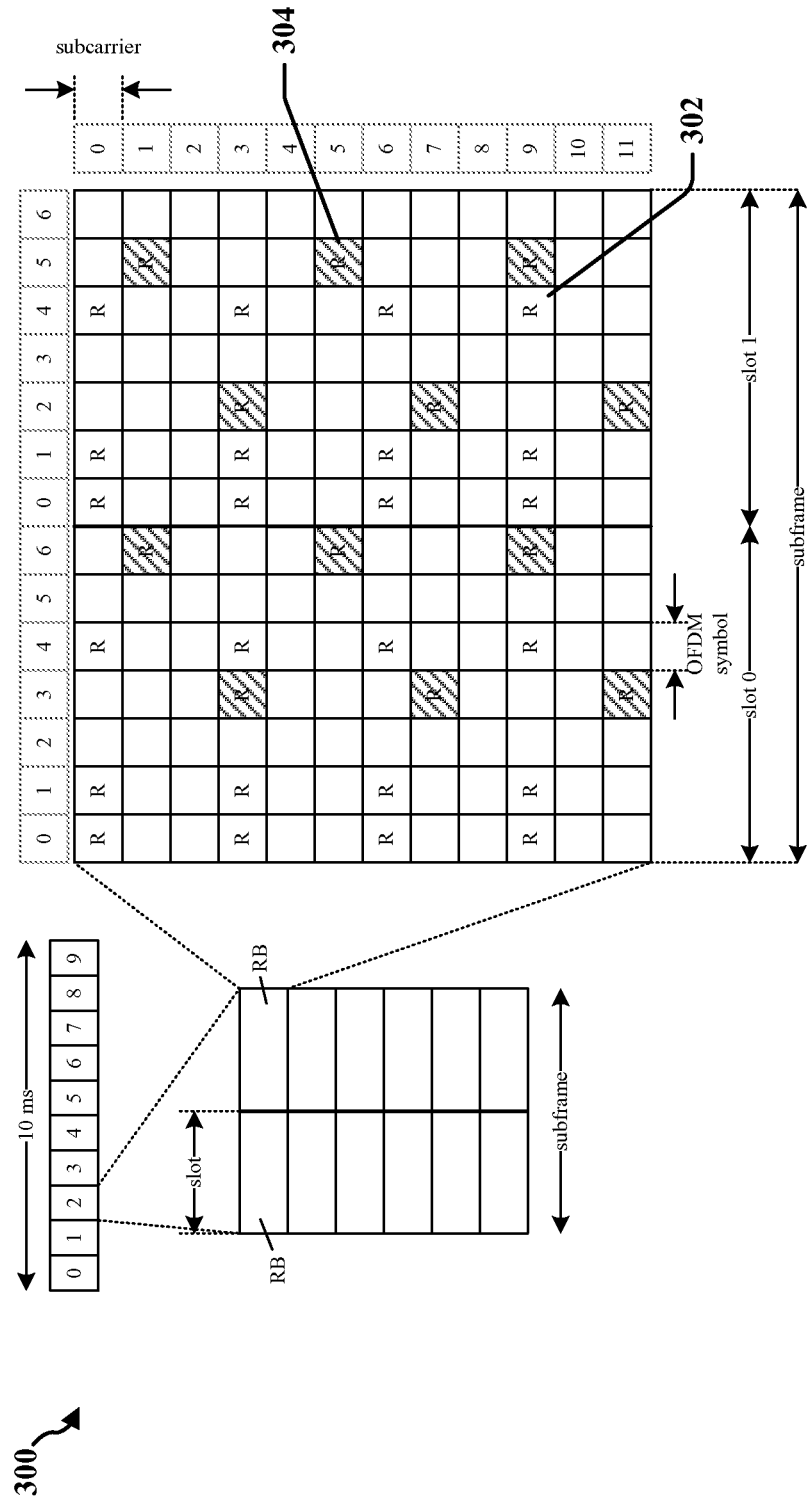
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
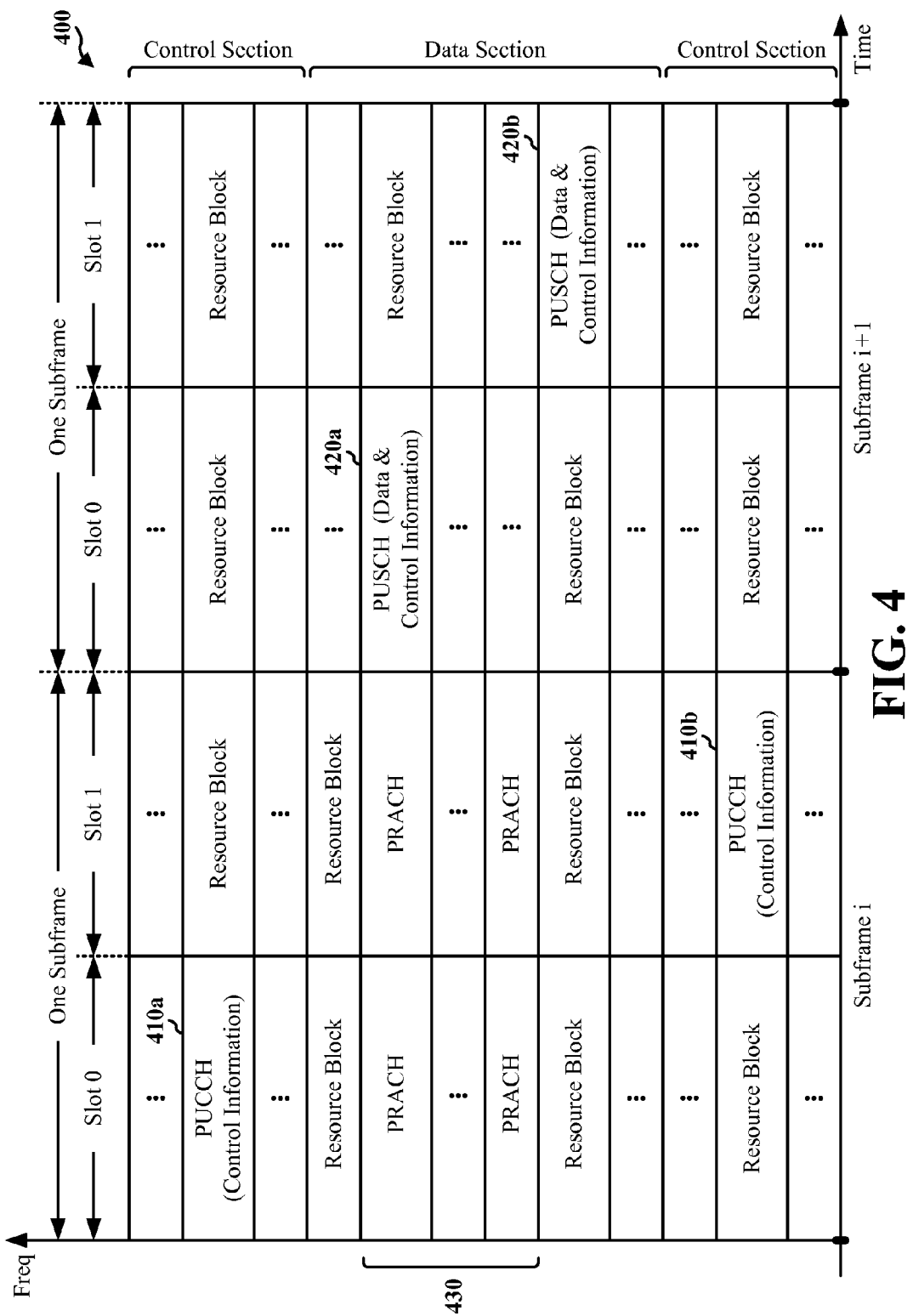
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
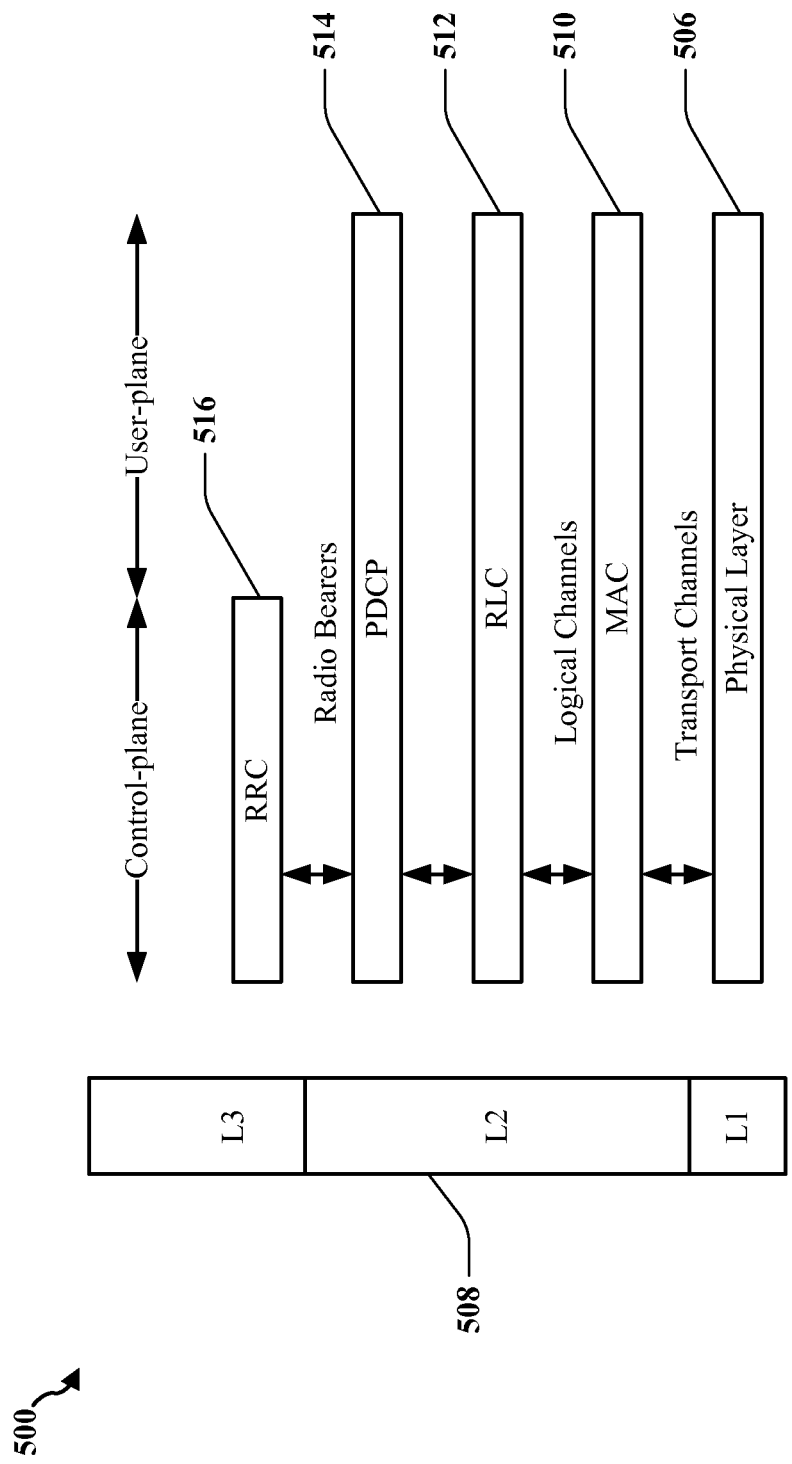
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
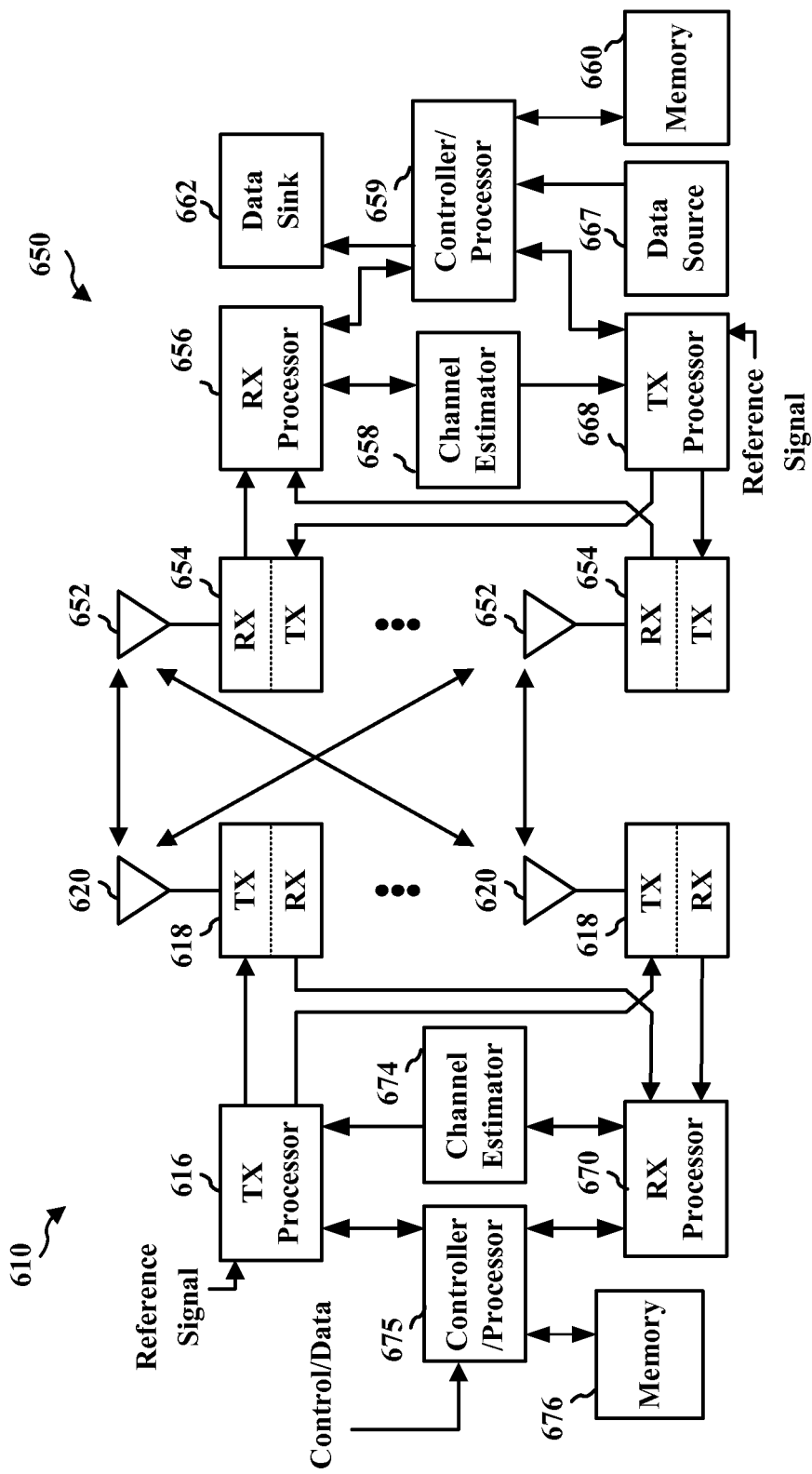
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
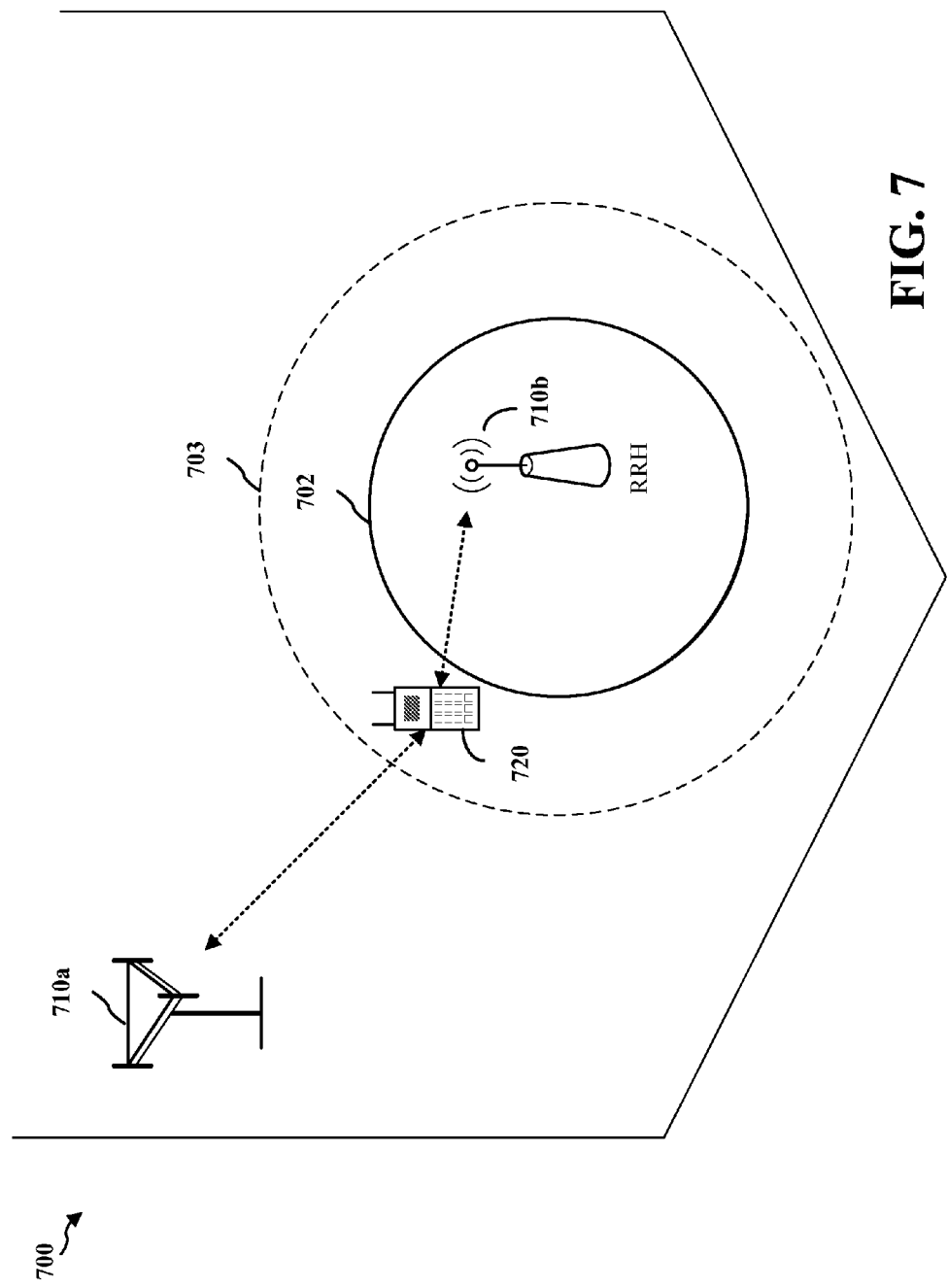
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancelation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

In LTE Releases 8, 9, and 10, cell-specific reference signals (CRS) are present in all subframes. For example, one, two, or four CRS ports can be supported. The CRS power can be boosted up to 6 dB. If the CRS power is boosted, then the power of the PDSCH must be decreased to compensate for the boost in CRS power. As a result, PDSCH energy per resource element (EPRE) is not constant over all OFDM symbols. The ratio of PDSCH EPRE to CRS EPRE among PDSCH resource elements for each OFDM symbol is denoted by either $\rho_A$ or $\rho_B$ depending on whether or not the OFDM symbol contains a CRS. For example, if the OFDM symbol contains a CRS, the ratio of the EPRE for PDSCH (also referred to as "PDSCH EPRE") to the EPRE for CRS (also referred to as "CRS EPRE") is denoted by $\rho_B$. If the OFDM symbol does not contain a CRS, the ratio of PDSCH EPRE to CRS EPRE is denoted by $\rho_A$.

Figure 8:
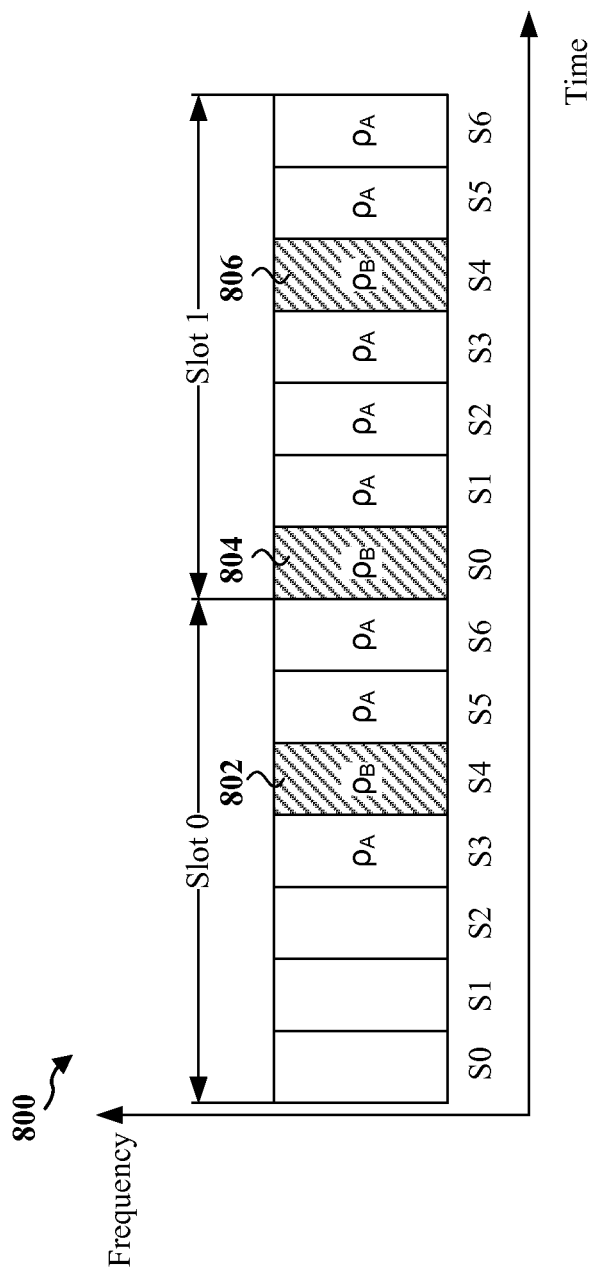
FIG. 8 illustrates a subframe of an LTE frame.

FIG. 8 illustrates a subframe 800 of an LTE frame. As shown in FIG. 8, subframe 800 includes two slots (e.g., slot 0 and slot 1), where each slot includes seven OFDM symbols (e.g., "S0" through "S6"). For example, slot 0 and slot 1 may each be 0.5 ms. Subframe 800 includes three control symbols (e.g., normal cyclic prefix (CP), 2-port CRS), such as symbols 802, 804, and 806, which include a CRS. Accordingly, in the subframe 800, a CRS is present in symbol 0 (not shown since it is within the control region consisting of the three control symbols) and symbol 4 (i.e., symbol 802) of slot 0 and symbols 0 and 4 (i.e., symbols 804 and 806, respectively) of slot 1 in the subframe 800.

Although the values of $\rho_A$ and $\rho_B$ are UE-specific, the ratio of $\rho_B$ to $\rho_A$ is cell-specific and is indicated by a parameter "$P_B$". Table 1 shows the possible values of $P_B$ and the corresponding cell-specific ratios $\rho_B/\rho_A$ for one, two, and four antenna port configurations.

TABLE 1

| $P_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

Figure 9:
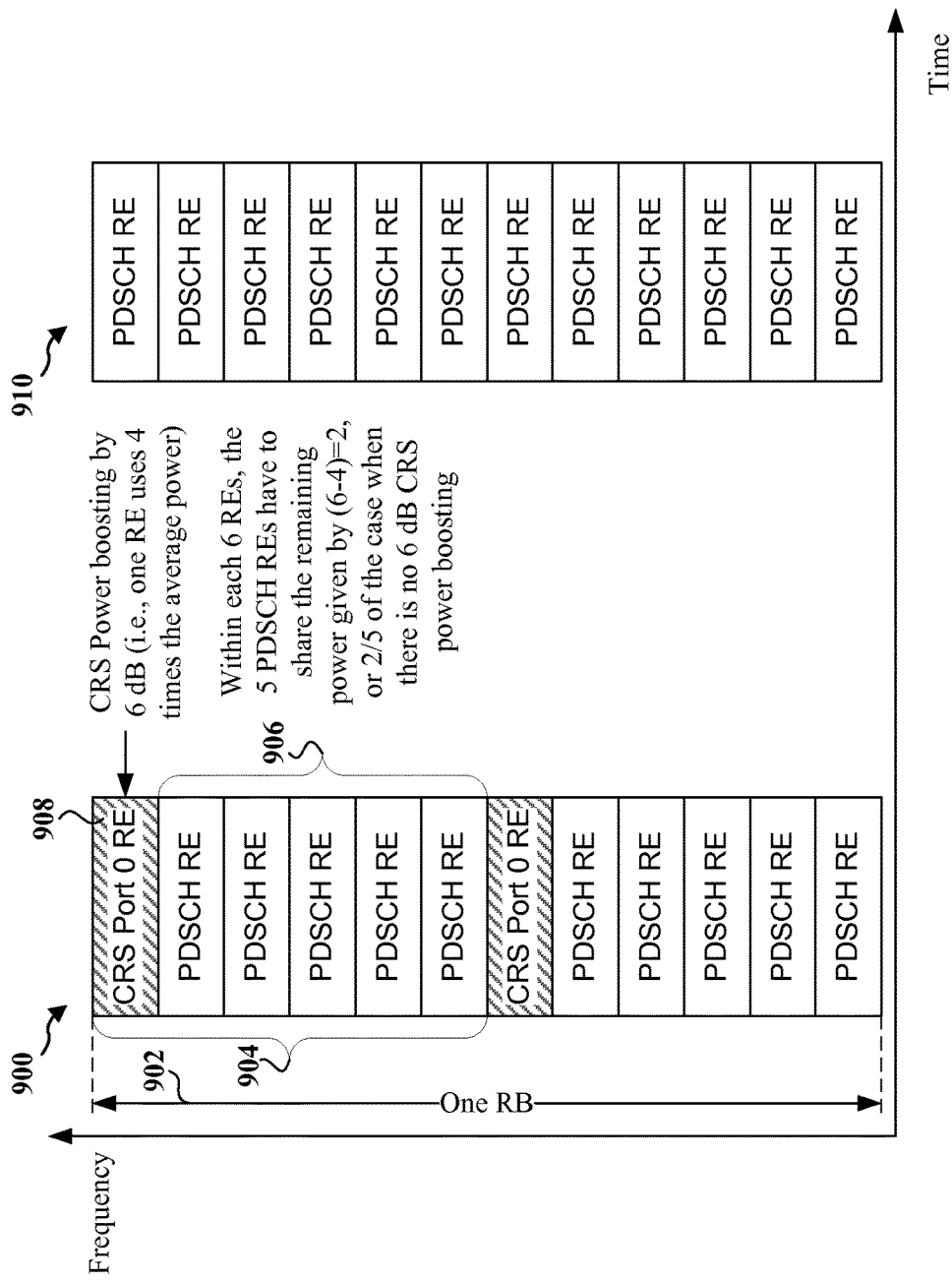
FIG. 9 illustrates a first OFDM symbol and a second OFDM symbol of a resource block.

FIG. 9 illustrates first OFDM symbol 900 and second OFDM symbol 910 of resource block ("RB") 902, according to one example. As shown in FIG. 9, the first OFDM symbol 900 includes one CRS in each set (e.g., set 904) of six resource elements ("REs"), whereas the second OFDM symbol 910 does not include a CRS. The first OFDM symbol 900 is configured for one antenna port with a $P_B$ value of 3, which corresponds to a 6 dB power boost of the CRS. Therefore, as indicated in Table 1, the value of the ratio $\rho_B/\rho_A$ corresponding to the $P_B$ value of 3 is 2/5.

If the power of the CRS is boosted by 6 dB, the resource element including the CRS, such as resource element 908, requires four times the average power of the other four resource elements in the set 904. Consequently, the other five resource elements 906 in the set 904 must share the remaining power, which is 2/5 of the power used for each resource element when the power of the CRS is not boosted or when the CRS is present in the same symbol.

In LTE Releases 8, 9, and 10, the physical downlink control channel (PDCCH) may be located in several symbols of a subframe. PDCCHs are fully distributed in the entire system bandwidth and are time domain multiplexed with PDSCHs. Therefore, a subframe is effectively divided into a control region and a data region. In LTE Release 11, however, a new control (e.g., enhanced PDCCH (ePDCCH)) may be introduced. Unlike the legacy PDCCH, which may occupy the first several control symbols in a subframe, ePDCCH will occupy the data region, similar to PDSCH. E-PDCCH messages are configured to span both first and second slots (FDM based e-PDCCH) of a subframe.

In LTE Release 11 and later, a new carrier type (NCT) may be provided. The NCT may not necessarily be backward compatible with prior (i.e., legacy) carrier types. In the NCT, the presence of CRS may be present only in a subset of subframes. For example, the CRS may be present in every five subframes. Such a configuration may be used to reduce DL overhead and to provide energy savings for the eNB, etc.

In LTE Release 11, the NCT is associated with a backward compatible carrier as part of carrier aggregation. A carrier of the NCT may not be a standalone carrier in LTE Release 11. However, this constraint may be relaxed in future releases such that a carrier of the NCT may be a standalone carrier. The NCT may not have the legacy control region, at least in some subframes (if not in all subframes). The NCT may completely rely on ePDCCH (and potentially enhanced physical control format indicator channel (ePCFICH)/enhanced physical hybrid-ARQ indicator channel (ePHICH), etc.) for the necessary control signaling, or control from another carrier.

In the NCT, only a 1-port CRS may be present and only in every five subframes. The presence of the CRS may not be in the entire bandwidth. For example, in a 20 MHz system, a 1-port CRS may be present in the center 25 resource blocks. The 1-port CRS is not used for demodulation purposes.

Since the 1-port CRS still needs to be transmitted (possibly in a smaller bandwidth than the system bandwidth) in the NCT, the $P_B$ may still be needed in the NCT. Moreover, the CRS may be power boosted, e.g., for better time/frequency tracking, and/or for better path loss estimation. However, because the 1-port CRS is only a subset of resource blocks of the system bandwidth, the ratio $\rho_B/\rho_A$ for the NCT may be interpreted differently than for legacy carrier types.

Figure 10:
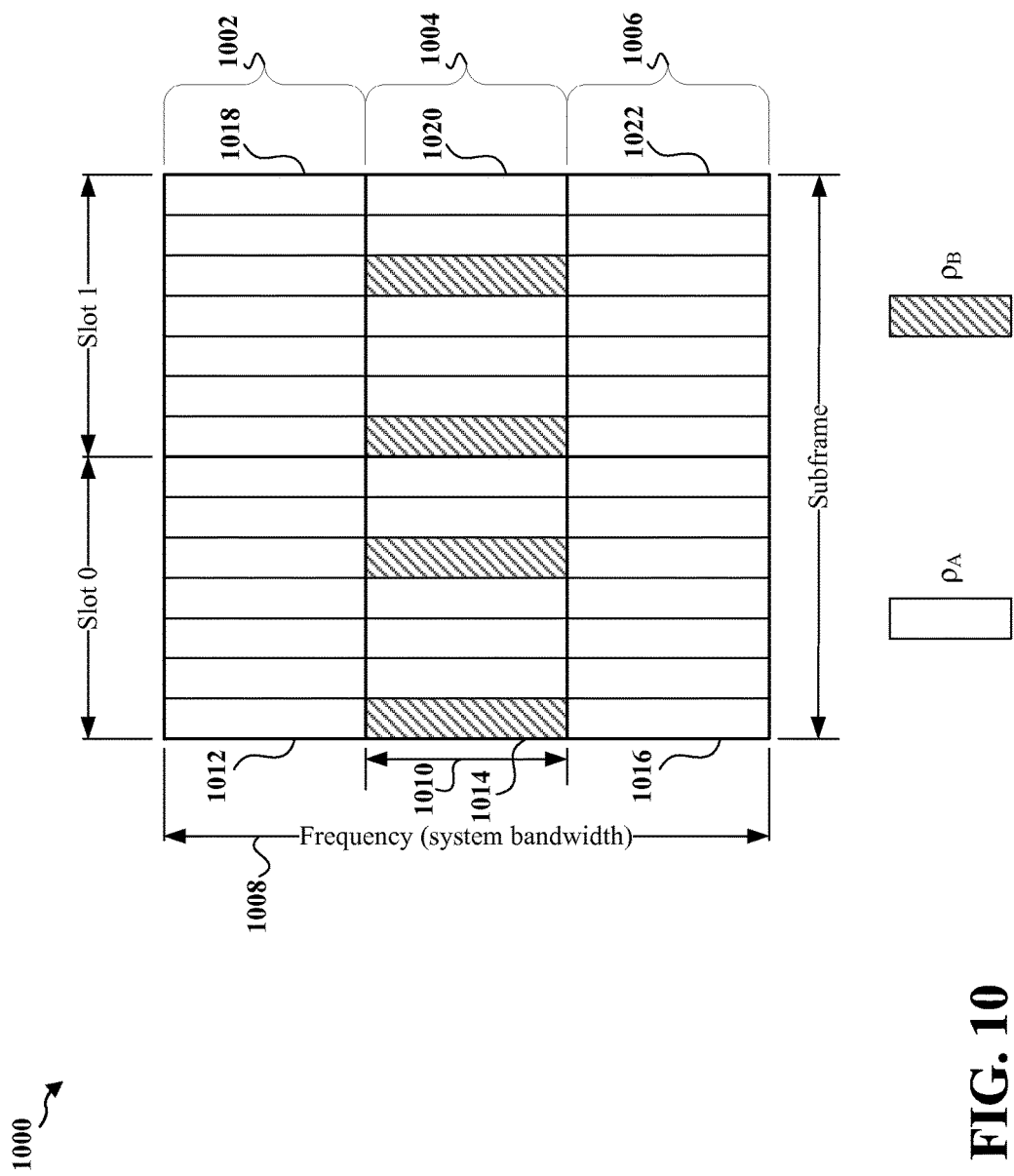
FIG. 10 illustrates a subframe of an LTE frame.

FIG. 10 illustrates a subframe 1000 of an LTE frame using a normal CP. In the configuration of FIG. 10, the subframe 1000 includes resource blocks 1012, 1014, and 1016 in Slot 0 and resource blocks 1018, 1020, and 1022 in Slot 1. For example, each resource block in FIG. 10 may include seven OFDM symbols. In an aspect, each OFDM symbol may include one or more REs (not shown in FIG. 10).

In the configuration of FIG. 10, the row of resource blocks 1004 includes CRS, whereas the rows of resource blocks 1002 and 1006 do not include CRS. The ratio $\rho_B/\rho_A$ is resource block dependent because it is assumed that CRS is present only in a subset 1010 of the system bandwidth 1008. $P_B$ (i.e., the value indicating the ratio $\rho_B/\rho_A$) can be signaled to the UE for the resource blocks containing CRS. For the resource blocks not containing CRS, the ratio $\rho_B/\rho_A$ is 1.

Figure 11:
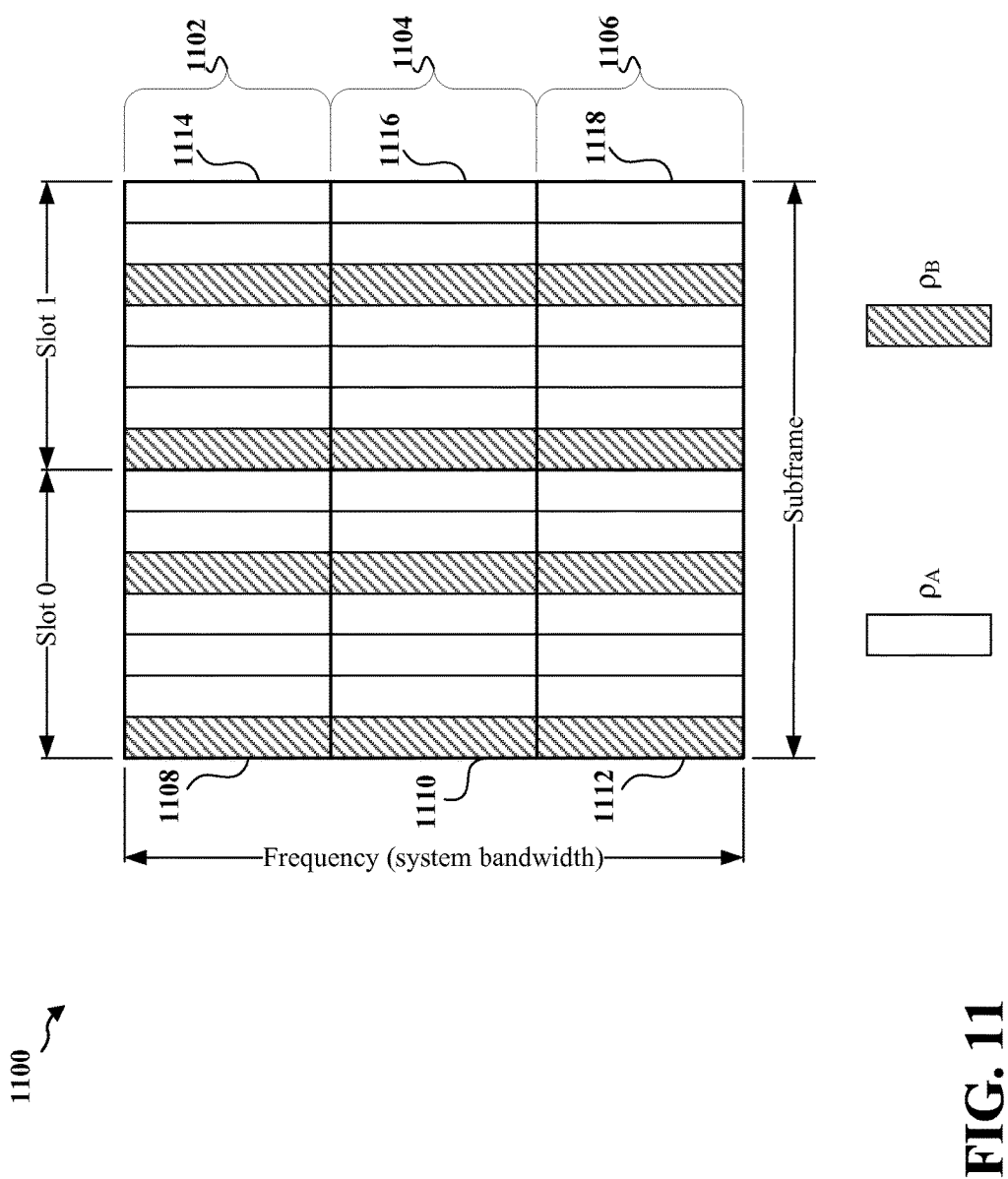
FIG. 11 illustrates a subframe of an LTE frame.

FIG. 11 illustrates a subframe 1100 of an LTE frame using a normal CP. In the configuration of FIG. 11, the subframe 1100 includes resource blocks 1108, 1110, and 1112 in Slot 0 and resource blocks 1114, 1116, and 1118 in Slot 1. For example, each resource block in FIG. 11 may include seven OFDM symbols. In an aspect, each OFDM symbol may include one or more REs (not shown in FIG. 11).

In the configuration of FIG. 11, the row of resource blocks 1104 includes CRS, whereas the rows of resource blocks 1102 and 1106 do not include CRS. The ratio $\rho_B/\rho_A$ is applied to all resource blocks, regardless of whether CRS is present or not. However, the ratio $\rho_B/\rho_A$ corresponding to a value of $P_B$ is calculated based on the CRS bandwidth and the system bandwidth and, therefore, the possible values of the ratio $\rho_B/\rho_A$ may no longer be the values indicated in Table 1. In one aspect, the ratio $\rho_B/\rho_A$ can be determined by determining the ratio (herein indicated as "$\alpha$") of the CRS bandwidth to the system bandwidth, such that $\alpha$ is less than one. For example, the amount of power that is used by a resource element including a power boosted CRS in a set of six resource elements of a resource block may be determined using equation 1:

$$\text{CRS RE Power} = \alpha * P_B + (1-\alpha) \qquad \text{(equation 1)}$$

where $\alpha$ represents the ratio of CRS bandwidth to system bandwidth, and $P_B$ represents the amount of power boosting in linear units. For example, if 25 out of a total of 100 resource blocks includes CRS, $\alpha$ may be determined as 25/100=0.25. Moreover, if $P_B$=3 and the power of each CRS is boosted by 6 dB (i.e., 4 linear units), equation 1 provides 0.25*4+(1-0.25)=1.75. Therefore, the resource element including the power boosted CRS in the example above uses 1.75 times the average power of the other resource elements not including CRS. Accordingly, if a resource element in a set of six resource elements of a resource block includes CRS, the remaining five resource elements must share the remaining power, which may be expressed as (6−1.75)/5, or 4.25/5 per resource block. Therefore, in the example above, the ratio $\rho_B/\rho_A$ corresponding to a $P_B$ value of 3 may be indicated as 4.25/5.

For UEs not relying on CRS for demodulation, there is no need to define $\rho_B$ and $\rho_A$ individually, so long as there are two types of PDSCH symbols and a cell-specific ratio between the EPRE of the first type (when CRS is present) and the EPRE of the second type (when CRS is not present). The RB-dependent and/or subframe-dependent ratio $\rho_B/\rho_A$ can be signaled to the UE. In one aspect, the explicit ratio $\rho_B/\rho_A$ can be signaled to the UE. In another configuration, a ratio that the UE can use to compute the ratio $\rho_B/\rho_A$ (e.g., based on CRS bandwidth and system bandwidth) can be signaled to the UE. Either the explicit ratio $\rho_B/\rho_A$ or the ratio that the UE can use to compute the ratio $\rho_B/\rho_A$ may be signaled via a broadcast or dedicated signaling. In one aspect, the UE may determine how to apply the ratio $\rho_B/\rho_A$ through an implicit derivation. In another aspect, the UE may determine how to apply the ratio $\rho_B/\rho_A$ by receiving a signal that explicitly indicates the manner in which the ratio $\rho_B/\rho_A$ is to be applied. For example, the UE may be configured to apply the ratio $\rho_B/\rho_A$ only to subframes containing CRS and the fraction of bandwidth containing CRS. As discussed infra, the resource block and/or subframe dependent ratio $\rho_B/\rho_A$ may be applied to other configurations.

Figure 12:
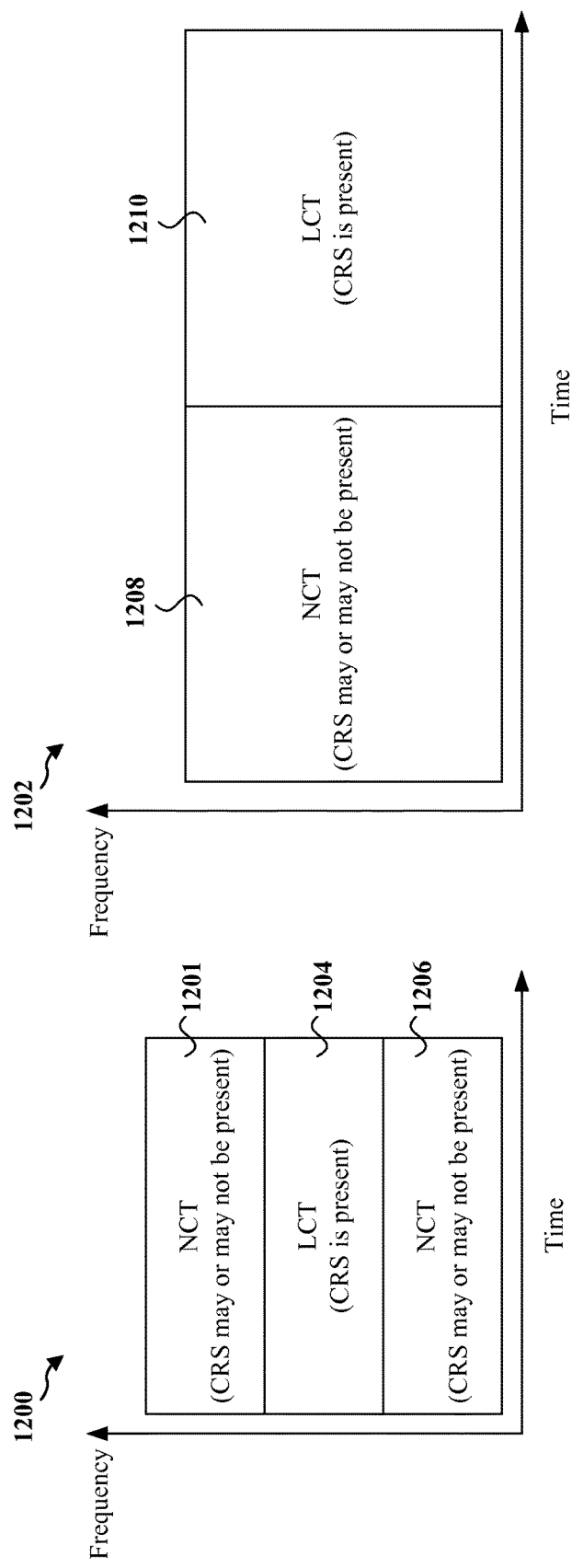
FIG. 12 illustrates subframes of an LTE frame that include a legacy carrier type and a new carrier type.

FIG. 12 illustrates subframes 1200 and 1202 of an LTE frame that includes a legacy carrier type (LCT) (e.g., an LTE Release 8/9/10 carrier type) and an NCT (e.g., an LTE Release 11 or later carrier type). As shown in FIG. 12, the subframe 1200 may carry the LCT (e.g., LCT 1204) and NCT (e.g., NCTs 1201, 1206) simultaneously using frequency domain multiplexing (FDM). Alternatively, the subframe 1202 may carry the LCT (e.g., LCT 1210) and NCT (e.g., NCT 1208) using time domain multiplexing (TDM). It can be appreciated that the number of CRS ports in the LCT and NCT can be different, such as 1-port for the NCT and 1/2/4-port for the LCT. The CRS bandwidth for the LCT and NCT can be the same or different. As a result, different UEs (i.e., UEs configured for the LCT and UEs configured for the NCT) may receive an indication of different PDSCH EPRE ratios for different PDSCH symbols.

In one configuration, the ratio $\rho_B/\rho_A$ corresponding to a $P_B$ for LCT resource blocks may be different from the ratio $\rho_B/\rho_A$ corresponding to a $P_B$ for NCT resource blocks for NCT UEs. In another configuration, the ratio $\rho_B/\rho_A$ corresponding to a $P_B$ for LCT resource blocks may be the same for the ratio $\rho_B/\rho_A$ corresponding to a $P_B$ for NCT resource blocks for NCT UEs. The ratio $\rho_B/\rho_A$ can take into account the power boosting for CRS (which may be different for respective NCT and LCT bandwidth parts), the different number of CRS ports in the NCT and LCT bandwidth parts, and the bandwidth for the NCT and LCT. For subframe 1202 based on TDM, a set of three PDSCH EPRE ratio values may be applicable, that is, one for LCT operation, one for NCT operation with 1-port CRS, and one for NCT operation without 1-port CRS. In light of the potential co-existence with NCT of different number of CRS ports, the ratio $\rho_B/\rho_A$ with values not necessarily associated with 1-port CRS may be indicated to a user of the NCT.

Figure 13:
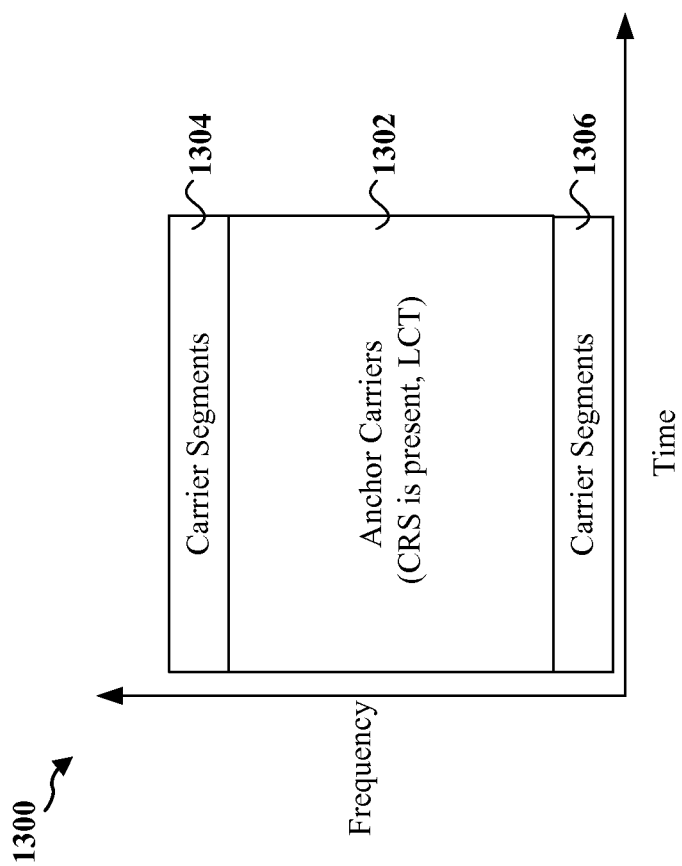
FIG. 13 illustrates a subframe of an LTE frame that includes a backward compatible anchor carrier and carrier segments.

FIG. 13 illustrates subframe 1300 of an LTE frame that includes a backward compatible anchor carrier and carrier segments. As shown in FIG. 13, the subframe 1300 includes anchor carriers 1302, which includes the LCT and CRS, and carrier segments 1304 and 1306, which include additional bandwidth available only to users of new UEs (i.e., UEs configured for the NCT). The new UEs treat the LCT in the anchor carriers 1302 and the additional bandwidth in the carrier segments 1304 and 1306 as a single carrier. In one configuration, the PDSCH EPRE ratio $\rho_B/\rho_A$ in the LCT in the anchor carriers 1302 may be different than the PDSCH EPRE ratio $\rho_B/\rho_A$ in the carrier segments 1304 and 1306 if the carrier segments do not carry CRS, and/or carry CRS with different configurations, such as 1-port only.

Due to the resource block dependent and/or subframe dependent presence of CRS, the PDSCH EPRE ratio $\rho_B/\rho_A$, which represents the ratio of PDSCH EPRE in symbols containing CRS to PDSCH EPRE in symbols without CRS, may also be resource block dependent and/or subframe dependent. For example, an NCT with 1-port CRS may have a bandwidth less than the system bandwidth, where the 1-port CRS is present only in one out of five subframes; a NCT with 1-port CRS with full bandwidth or partial bandwidth co-existing with LCT in FDM, TDM, or TDM and FDM manner; carrier segments where CRS may be configured differently from the anchor carrier, etc. As previously discussed, the PDSCH EPRE ratio $\rho_B/\rho_A$ can be indicated to a UE. It should be understood that the configurations and aspects disclosed herein may apply to subframes including reference signals other than CRS, such as narrowband channels state information reference signals (CSI-RS). For example, in narrowband CSI-RS, the ratio $\rho_B/\rho_A$ representing the ratio of PDSCH EPRE in symbols containing the RS to PDSCH EPRE in symbols without the RS may be resource block and/or subframe dependent.

Figure 14:
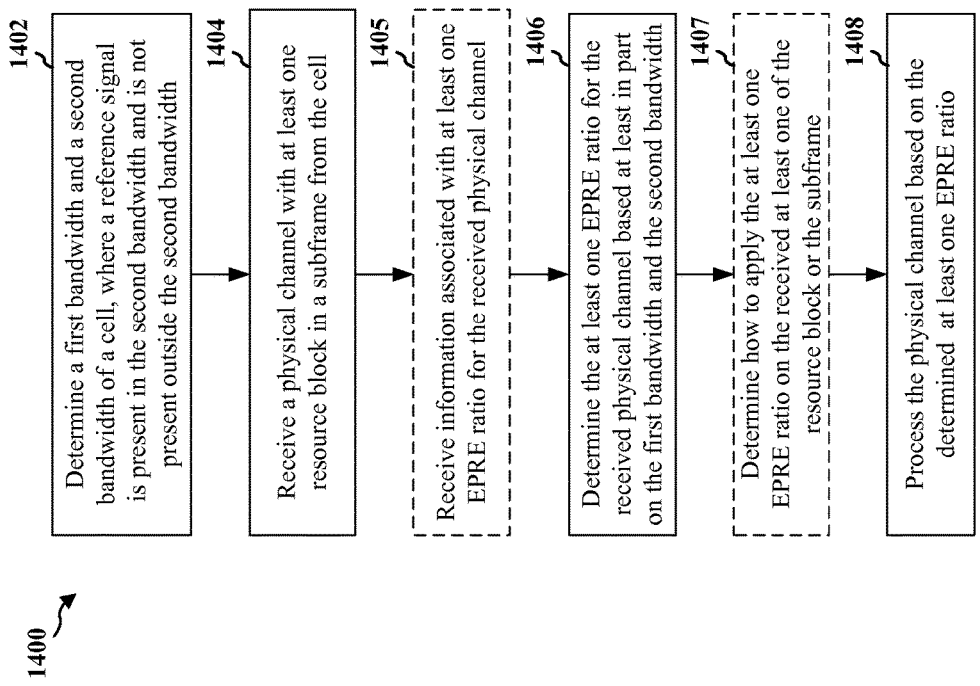
FIG. 14 is a flow chart of a method of wireless communication.

FIG. 14 is a flow chart 1400 of a method of wireless communication. The method may be performed by a UE. At step 1402, the UE determines a first bandwidth and a second bandwidth of a cell, where a reference signal is present in the second bandwidth and is not present outside the second bandwidth. In an aspect, the second bandwidth is less than the first bandwidth. For example, with reference to FIG. 10, the first bandwidth may be the system bandwidth 1008 and the second bandwidth may be the subset 1010 of the system bandwidth 1008. In an aspect, the reference signal is a CRS and/or a CSI-RS.

At step 1404, the UE receives a physical channel with at least one resource block in a subframe from the cell. The subframe may include one or more symbols, such as OFDM symbols. For example, the physical channel may be a PDSCH or an EPDCCH.

At step 1405, the UE receives information associated with at least one EPRE ratio for the received physical channel. The UE may determine the at least one EPRE ratio based on the received information.

At step 1406, the UE determines the at least one EPRE ratio for the received physical channel based at least in part on the first bandwidth and the second bandwidth. In an aspect, the EPRE ratio is a PDSCH EPRE in at least one symbol in the subframe containing the reference signal divided by a PDSCH EPRE in at least another symbol in the subframe not containing the reference signal. In another aspect, the EPRE ratio is the PDSCH EPRE in at least one symbol in the subframe divided by the EPRE of the reference signal in the subframe.

At step 1407, the UE determines how to apply the at least one EPRE ratio on the received at least one of the resource block or the subframe. In an aspect, the determination of how to apply the at least one EPRE ratio is made based on an implicit derivation and/or explicit signaling. In one aspect, the at least one EPRE ratio is further determined based on a number of antenna ports for the reference signal. In another aspect, the first bandwidth of the subframe is of a first carrier type, and the second bandwidth of the subframe is of a second carrier type, and a different EPRE ratio is determined for the first bandwidth and the second bandwidth. In such aspect, the second carrier type is an anchor carrier and the first carrier type is a carrier aggregating the anchor carrier and at least one additional carrier segment.

In an aspect, the UE determines how to apply the at least one EPRE ratio by determining to apply a first EPRE ratio for a first resource block without the reference signal and to apply a second EPRE ratio for a second resource block with the reference signal. In such aspect, the first resource block and the second resource block are concurrent in the same subframe.

In an aspect, the UE determines how to apply the at least one EPRE ratio by determining to apply a same EPRE ratio for a first resource block without the reference signal and for a second resource block with the reference signal. In such aspect, the first resource block and the second resource block are concurrent in the same subframe, and the same EPRE ratio is determined based on the ratio of the second bandwidth and the first bandwidth and the EPRE of the reference signal in the second bandwidth.

In another aspect, the UE determines how to apply the at least one EPRE ratio by determining to apply a first EPRE ratio for a first subframe with the reference signal of a first carrier type and to apply a second EPRE ratio for a second subframe of a second carrier type, and determining to apply a third EPRE ratio for a third subframe without the reference signal within the first carrier type.

In another aspect, the UE determines how to apply the at least one EPRE ratio by determining to apply a first EPRE ratio for a first subframe and to apply a second EPRE ratio for a second subframe with the reference signal. In such aspect, the first subframe and the second subframe are in the same radio frame and the first EPRE ratio and the second EPRE ratio are different.

Finally, at step 1408, the UE processes the physical channel based on the determined at least one EPRE ratio. In an aspect, the UE may further process the physical channel (e.g., PDSCH or EPDCCH) in accordance with the determination of how the at least one EPRE ratio is to be applied.

Figure 15:
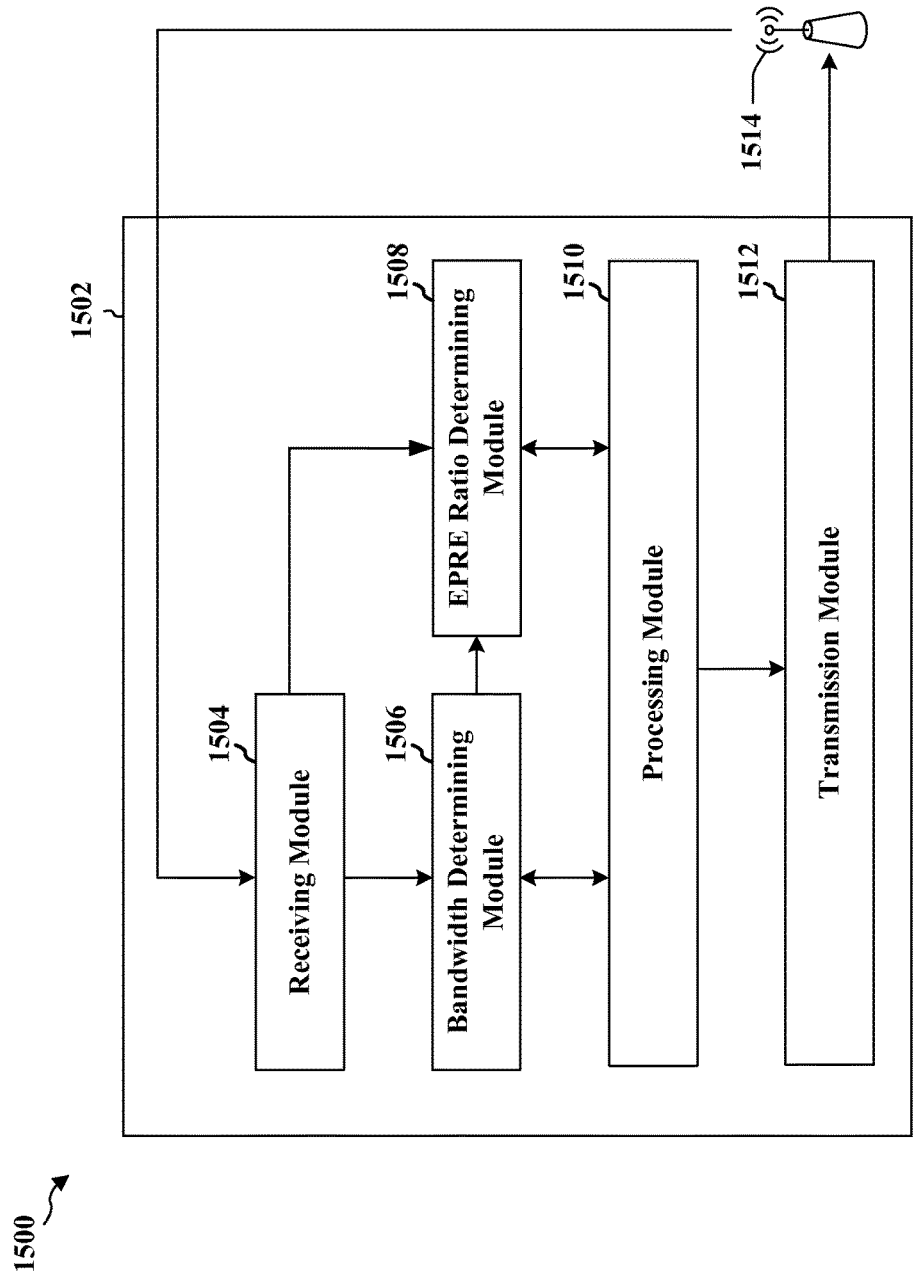
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE. The apparatus includes a receiving module 1504 that receives a physical channel (e.g., PDSCH or EPDCCH) with at least one resource block in a subframe from the cell. In one configuration, the receiving module 1504 further receives information associated with at least one EPRE ratio for the received physical channel. The apparatus further includes a bandwidth determining module 1506 that determines a first bandwidth and a second bandwidth of a cell, where the reference signal is present in the second bandwidth and is not present outside the second bandwidth. The apparatus further includes an EPRE ratio determining module 1508 that determines at least one EPRE ratio for the received physical channel based at least in part on the first bandwidth and the second bandwidth. In one configuration, the EPRE ratio determining module 1508 further determines how to apply the at least one EPRE ratio on the received at least one of the resource block or the subframe. The apparatus further includes a processing module 1510 that processes the physical channel based on the determined at least one EPRE ratio. The apparatus further includes a transmission module 1512 for transmitting to an eNB 1514.

The apparatus may include additional modules that perform each of the steps of the algorithm in the aforementioned flow chart of FIG. 14. As such, each step in the aforementioned flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
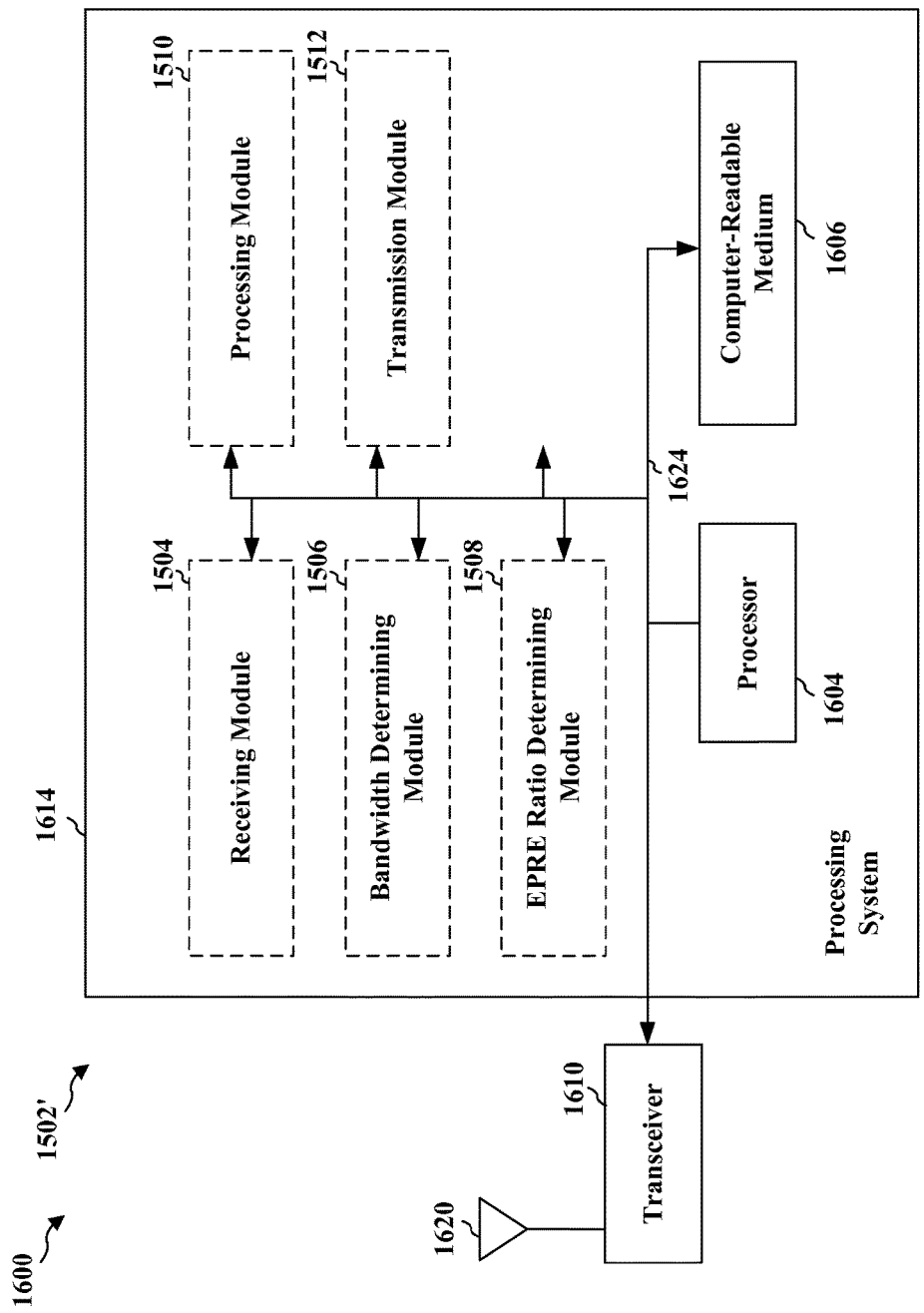
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, and 1512, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1504, 1506, 1508, 1510, and 1512. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for determining a first bandwidth and a second bandwidth of a cell, means for receiving a physical channel with at least one resource block in a subframe from the cell, the subframe comprising one or more symbols, means for determining at least one EPRE ratio for the received physical channel based at least in part on the first bandwidth and the second bandwidth, means for processing the physical channel based on the determined at least one EPRE ratio, means for receiving information associated with the at least one EPRE ratio, and means for determining how to apply the at least one EPRE ratio on the received at least one of the resource block or the subframe. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    determining a first bandwidth and a second bandwidth of a cell, wherein data is present both in the second bandwidth and outside the second bandwidth, wherein a reference signal is present in the second bandwidth and is not present outside the second bandwidth;
    receiving a physical channel with at least one resource block in a subframe from the cell, the subframe comprising one or more symbols;
    determining at least one energy per resource element (EPRE) ratio for the received physical channel based at least in part on a ratio of a first number of resource blocks in the first bandwidth and a second number of resource blocks in the second bandwidth;
    wherein the first number of resource blocks and the second number of resource blocks are different; and
    processing the physical channel based on the determined at least one EPRE ratio.

2. The method of claim 1, wherein the physical channel is a physical downlink shared channel (PDSCH).

3. The method of claim 1, wherein the physical channel is an enhanced physical downlink control channel (EPDCCH).

4. The method of claim 1, wherein the second bandwidth is less than the first bandwidth.

5. The method of claim 1, wherein the reference signal is at least one of a common reference signal (CRS) and a channel-state-information reference signal (CSI-RS).

6. The method of claim 1, wherein the at least one EPRE ratio is a PDSCH EPRE in at least one symbol in the subframe containing the reference signal divided by a PDSCH EPRE in at least another symbol in the subframe not containing the reference signal.

7. The method of claim 1, wherein the at least one EPRE ratio is a PDSCH EPRE in at least one symbol in the subframe divided by the EPRE of the reference signal in the subframe.

8. The method of claim 1, further comprising receiving information associated with the at least one EPRE ratio, wherein the at least one EPRE ratio is further determined based on the received information.

9. The method of claim 1, further comprising determining how to apply the at least one EPRE ratio on the received at least one resource block in the subframe.

10. The method of claim 9, wherein the determination of how to apply the at least one EPRE ratio is made based on at least one of an implicit derivation or explicit signaling.

11. The method of claim 9, wherein the at least one EPRE ratio comprises first and second EPRE ratios, and wherein the determining how to apply the at least one EPRE ratio comprises determining to apply the first EPRE ratio for a first resource block without the reference signal and to apply the second EPRE ratio for a second resource block with the reference signal, the first resource block and the second resource block being concurrent in the same subframe.

12. The method of claim 9, wherein the determining how to apply the at least one EPRE ratio comprises determining to apply a same EPRE ratio for a first resource block without the reference signal and for a second resource block with the reference signal, the first resource block and the second resource block being concurrent in the same subframe, wherein the same EPRE ratio is determined based on a ratio of the second bandwidth and the first bandwidth and an EPRE of the reference signal in the second bandwidth.

13. The method of claim 9, wherein the at least one EPRE ratio comprises first, second, and third EPRE ratios, wherein the determining how to apply the at least one EPRE ratio comprises:
  determining to apply the first EPRE ratio for a first subframe with the reference signal of a first carrier type and to apply the second EPRE ratio for a second subframe of a second carrier type; and
  determining to apply the third EPRE ratio for a third subframe without the reference signal within the first carrier type.

14. The method of claim 9, wherein the at least one EPRE ratio comprises first and second EPRE ratios, wherein the determination of how to apply the at least one EPRE ratio comprises:
  determining to apply the first EPRE ratio for a first subframe and to apply the second EPRE ratio for a second subframe with the reference signal, wherein the first subframe and the second subframe are in the same radio frame and the first EPRE ratio and the second EPRE ratio are different.

15. The method of claim 1, wherein the at least one EPRE ratio is further determined based on a number of antenna ports for the reference signal.

16. The method of claim 1, wherein the first bandwidth of the subframe is of a first carrier type, and the second bandwidth of the subframe is of a second carrier type, and a different EPRE ratio is determined for the first bandwidth and the second bandwidth.

17. The method of claim 16, wherein the second carrier type is an anchor carrier and the first carrier type is a carrier aggregating the anchor carrier and at least one additional carrier segment.

18. An apparatus for wireless communication, comprising:
  means for determining a first bandwidth and a second bandwidth of a cell, wherein data is present both in the second bandwidth and outside the second bandwidth, wherein a reference signal is present in the second bandwidth and is not present outside the second bandwidth;
  means for receiving a physical channel with at least one resource block in a subframe from the cell, the subframe comprising one or more symbols;
  means for determining at least one energy per resource element (EPRE) ratio for the received physical channel based at least in part on a ratio of a first number of resource blocks in the first bandwidth and a second number of resource blocks in the second bandwidth; wherein the first number of resource blocks and the second number of resource blocks are different; and
  means for processing the physical channel based on the determined at least one EPRE ratio.

19. The apparatus of claim 18, wherein the physical channel is a physical downlink shared channel (PDSCH).

20. The apparatus of claim 18, wherein the physical channel is an enhanced physical downlink control channel (EPDCCH).

21. The apparatus of claim 18, wherein the second bandwidth is less than the first bandwidth.

22. The apparatus of claim 18, wherein the reference signal is at least one of a common reference signal (CRS) and a channel-state-information reference signal (CSI-RS).

23. The apparatus of claim 18, wherein the at least one EPRE ratio is a PDSCH EPRE in at least one symbol in the subframe containing the reference signal divided by a PDSCH EPRE in at least another symbol in the subframe not containing the reference signal.

24. The apparatus of claim 18, wherein the at least one EPRE ratio is a PDSCH EPRE in at least one symbol in the subframe divided by the EPRE of the reference signal in the subframe.

25. The apparatus of claim 18, further comprising means for receiving information associated with the at least one EPRE ratio, wherein the at least one EPRE ratio is further determined based on the received information.

26. The apparatus of claim 18, further comprising means for determining how to apply the at least one EPRE ratio on the received at least one resource block in the subframe.

27. The apparatus of claim 26, wherein the determination of how to apply the at least one EPRE ratio is made based on at least one of an implicit derivation or explicit signaling.

28. The apparatus of claim 26, wherein the at least one EPRE ratio comprises first and second EPRE ratios, and wherein the means for determining how to apply the at least one EPRE ratio is configured to determine to apply the first EPRE ratio for a first resource block without the reference signal and to apply the second EPRE ratio for a second resource block with the reference signal, the first resource block and the second resource block being concurrent in the same subframe.

29. The apparatus of claim 26, wherein the means for determining how to apply the at least one EPRE ratio is configured to determine to apply a same EPRE ratio for a first resource block without the reference signal and for a second resource block with the reference signal, the first resource block and the second resource block being concurrent in the same subframe, wherein the same EPRE ratio is determined based on a ratio of the second bandwidth and the first bandwidth and an EPRE of the reference signal in the second bandwidth.

30. The apparatus of claim 26, wherein the at least one EPRE ratio comprises first, second, and third EPRE ratios, wherein the means for determining how to apply the at least one EPRE ratio is configured to:
  determine to apply the first EPRE ratio for a first subframe with the reference signal of a first carrier type and to apply the second EPRE ratio for a second subframe of a second carrier type; and
  determine to apply a third PDSCH EPRE ratio for a third subframe without the reference signal within the first carrier type.

31. The apparatus of claim 26, wherein the at least one EPRE ratio comprises first and second EPRE ratios, wherein the means for determining how to apply the at least one EPRE ratio is configured to determine to apply the first EPRE ratio for a first subframe and to apply the second EPRE ratio for a second subframe with the reference signal, and wherein the first subframe and the second subframe are in the same radio frame and the first EPRE ratio and the second EPRE ratio are different.

32. The apparatus of claim 18, wherein the at least one EPRE ratio is further determined based on a number of antenna ports for the reference signal.

33. The apparatus of claim 18, wherein the first bandwidth of the subframe is of a first carrier type, and the second bandwidth of the subframe is of a second carrier type, and a different EPRE ratio is determined for the first bandwidth and the second bandwidth.

34. The apparatus of claim 33, wherein the second carrier type is an anchor carrier and the first carrier type is a carrier aggregating the anchor carrier and at least one additional carrier segment.

35. An apparatus for wireless communication, comprising:
  a memory; and
  at least one processor coupled to the memory and configured to:
    determine a first bandwidth and a second bandwidth of a cell, wherein data is present both in the second bandwidth and outside the second bandwidth, wherein a reference signal is present in the second bandwidth and is not present outside the second bandwidth;
    receive a physical channel with at least one resource block in a subframe from the cell, the subframe comprising one or more symbols;
    determine at least one energy per resource element (EPRE) ratio for the received physical channel based at least in part on a ratio of a first number of resource blocks in the first bandwidth and a second number of resource blocks in the second bandwidth;
    wherein the first number of resource blocks and the second number of resource blocks are different; and
    process the physical channel based on the determined at least one EPRE ratio.

36. The apparatus of claim 35, wherein the physical channel is a physical downlink shared channel (PDSCH).

37. The apparatus of claim 35, wherein the physical channel is an enhanced physical downlink control channel (EPDCCH).

38. The apparatus of claim 35, wherein the second bandwidth is less than the first bandwidth.

39. The apparatus of claim 35, wherein the reference signal is at least one of a common reference signal (CRS) and a channel-state-information reference signal (CSI-RS).

40. The apparatus of claim 35, wherein the at least one EPRE ratio is a PDSCH EPRE in at least one symbol in the subframe containing the reference signal divided by a PDSCH EPRE in at least another symbol in the subframe not containing the reference signal.

41. The apparatus of claim 35, wherein the at least one EPRE ratio is a PDSCH EPRE in at least one symbol in the subframe divided by the EPRE of the reference signal in the subframe.

42. The apparatus of claim 35, wherein the at least one processor is further configured to receive information associated with the at least one EPRE ratio, wherein the at least one EPRE ratio is further determined based on the received information.

43. The apparatus of claim 35, wherein the at least one processor is further configured to determine how to apply the at least one EPRE ratio on the received at least one resource block in the subframe.

44. The apparatus of claim 43, wherein the determination of how to apply the at least one EPRE ratio is made based on at least one of an implicit derivation or explicit signaling.

45. The apparatus of claim 43, wherein the at least one EPRE ratio comprises first and second EPRE ratios, and wherein, to determine how to apply the at least one EPRE ratio, the at least one processor is configured to determine to apply the first EPRE ratio for a first resource block without the reference signal and to apply the second EPRE ratio for a second resource block with the reference signal, the first resource block and the second resource block being concurrent in the same subframe.

46. The apparatus of claim 43, wherein, to determine how to apply the at least one EPRE ratio, the at least one processor is configured to determine to apply a same EPRE ratio for a first resource block without the reference signal and for a second resource block with the reference signal, the first resource block and the second resource block being concurrent in the same subframe, wherein the same EPRE ratio is determined based on a ratio of the second bandwidth and the first bandwidth and an EPRE of the reference signal in the second bandwidth.

47. The apparatus of claim 43, wherein the at least one EPRE ratio comprises first, second, and third EPRE ratios, wherein, to determine how to apply the at least one EPRE ratio, the at least one processor is configured to:
  determine to apply the first EPRE ratio for a first subframe with the reference signal of a first carrier type and to apply the second EPRE ratio for a second subframe of a second carrier type; and
  determine to apply the third EPRE ratio for a third subframe without the reference signal within the first carrier type.

48. The apparatus of claim 43, wherein the at least one EPRE ratio comprises first and second EPRE ratios, wherein, to determine how to apply the at least one EPRE ratio, the at least one processor is configured to:
  determine to apply the first EPRE ratio for a first subframe and to apply the second EPRE ratio for a second subframe with the reference signal, wherein the first subframe and the second subframe are in the same radio frame and the first EPRE ratio and the second EPRE ratio are different.

49. The apparatus of claim 35, wherein the at least one EPRE ratio is further determined based on a number of antenna ports for the reference signal.

50. The apparatus of claim 35, wherein the first bandwidth of the subframe is of a first carrier type, and the second bandwidth of the subframe is of a second carrier type, and a different EPRE ratio is determined for the first bandwidth and the second bandwidth.

51. The apparatus of claim 50, wherein the second carrier type is an anchor carrier and the first carrier type is a carrier aggregating the anchor carrier and at least one additional carrier segment.

52. A non-transitory computer-readable medium storing computer executable code for wireless communication, comprising code for:
  determining a first bandwidth and a second bandwidth of a cell, wherein data is present both in the second bandwidth and outside the second bandwidth, wherein a reference signal is present in the second bandwidth and is not present outside the second bandwidth;
  receiving a physical channel with at least one resource block in a subframe from the cell, the subframe comprising one or more symbols;
  determining at least one energy per resource element (EPRE) ratio for the received physical channel based at least in part on a ratio of a first number of resource blocks in the first bandwidth and a second number of resource blocks in the second bandwidth;

wherein the first number of resource blocks and the second number of resource blocks are different; and processing the physical channel based on the determined at least one EPRE ratio.

53. The non-transitory computer-readable medium of claim 52, wherein the physical channel is a physical downlink shared channel (PDSCH).

54. The non-transitory computer-readable medium of claim 52, wherein the physical channel is an enhanced physical downlink control channel (EPDCCH).

55. The non-transitory computer-readable medium of claim 52, wherein the second bandwidth is less than the first bandwidth.

56. The non-transitory computer-readable medium of claim 52, wherein the reference signal is at least one of a common reference signal (CRS) and a channel-state-information reference signal (CSI-RS).

57. The non-transitory computer-readable medium of claim 52, wherein the at least one EPRE ratio is a PDSCH EPRE in at least one symbol in the subframe containing the reference signal divided by a PDSCH EPRE in at least another symbol in the subframe not containing the reference signal.

58. The non-transitory computer-readable medium of claim 52, wherein the at least one EPRE ratio is a PDSCH EPRE in at least one symbol in the subframe divided by the EPRE of the reference signal in the subframe.

59. The non-transitory computer-readable medium of claim 52, the computer-readable medium further comprising code for receiving information associated with the at least one EPRE ratio, wherein the at least one EPRE ratio is further determined based on the received information.

60. The non-transitory computer-readable medium of claim 52, the computer-readable medium further comprising code for determining how to apply the at least one EPRE ratio on the received at least one resource block in the subframe.

61. The non-transitory computer-readable medium of claim 60, wherein the determination of how to apply the at least one EPRE ratio is made based on at least one of an implicit derivation or explicit signaling.

62. The non-transitory computer-readable medium of claim 60, wherein the at least one EPRE ratio comprises first and second EPRE ratios, and wherein the determining how to apply the at least one EPRE ratio comprises determining to apply the first EPRE ratio for a first resource block without the reference signal and to apply the second EPRE ratio for a second resource block with the reference signal, the first resource block and the second resource block being concurrent in the same subframe.

63. The non-transitory computer-readable medium of claim 60, wherein the determining how to apply the at least one EPRE ratio comprises determining to apply a same one EPRE ratio for a first resource block without the reference signal and for a second resource block with the reference signal, the first resource block and the second resource block being concurrent in the same subframe, wherein the same EPRE ratio is determined based on a ratio of the second bandwidth and the first bandwidth and an EPRE of the reference signal in the second bandwidth.

64. The non-transitory computer-readable medium of claim 60, wherein the at least one EPRE ratio comprises first, second, and third EPRE ratios, wherein the determining how to apply the at least one EPRE ratio comprises:

determining to apply the first EPRE ratio for a first subframe with the reference signal of a first carrier type and to apply the second EPRE ratio for a second subframe of a second carrier type; and determining to apply the third EPRE ratio for a third subframe without the reference signal within the first carrier type.

65. The non-transitory computer-readable medium of claim 60, wherein the at least one EPRE ratio comprises first and second EPRE ratios, wherein the determination of how to apply the at least one EPRE ratio comprises:

determining to apply the first EPRE ratio for a first subframe and to apply the second EPRE ratio for a second subframe with the reference signal, wherein the first subframe and the second subframe are in the same radio frame and the first EPRE ratio and the second EPRE ratio are different.

66. The non-transitory computer-readable medium of claim 52, wherein the at least one EPRE ratio is further determined based on a number of antenna ports for the reference signal.

67. The non-transitory computer-readable medium of claim 52, wherein the first bandwidth of the subframe is of a first carrier type, and the second bandwidth of the subframe is of a second carrier type, and a different EPRE ratio is determined for the first bandwidth and the second bandwidth.

68. The non-transitory computer-readable medium of claim 67, wherein the second carrier type is an anchor carrier and the first carrier type is a carrier aggregating the anchor carrier and at least one additional carrier segment.

* * * * *